Oct. 21, 1947.    G. W. CRISE    2,429,400
LATCH-TYPE THERMOSTATICALLY CONTROLLED REGULATOR
Filed Jan. 19, 1944
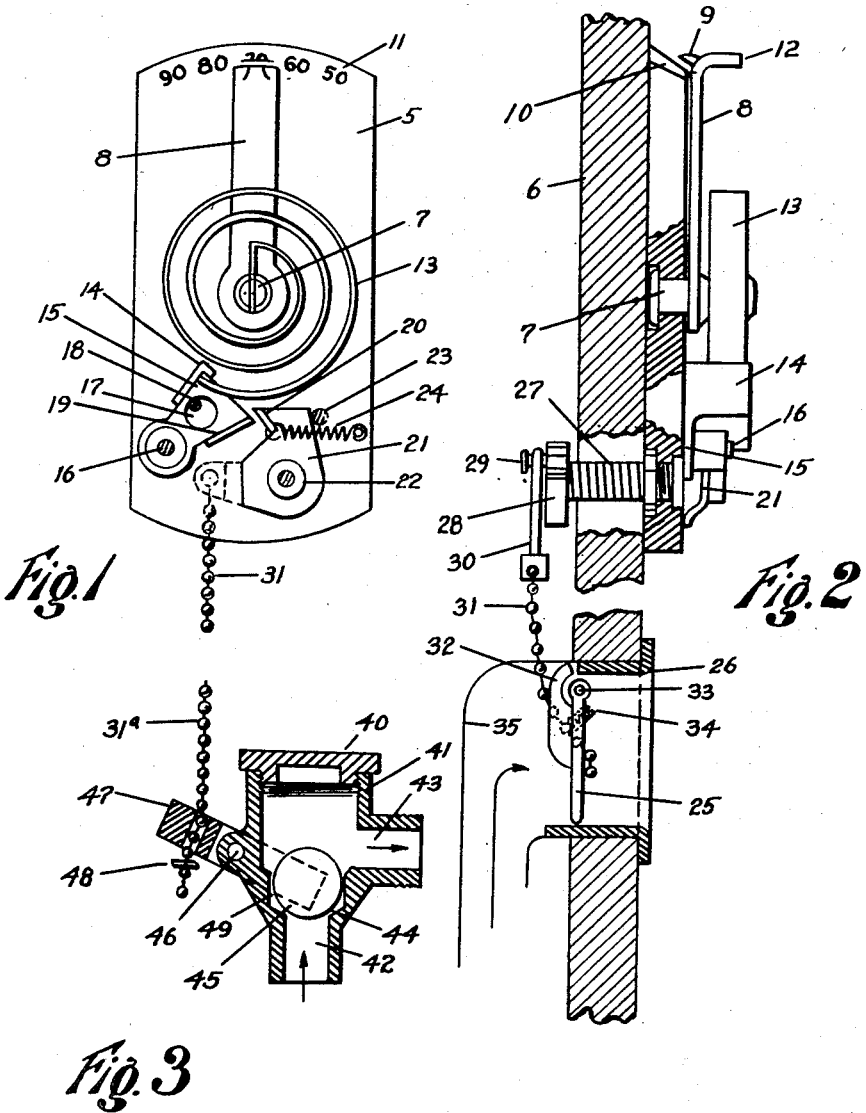
INVENTOR.
George W. Crise
BY
ATTORNEY Patented Oct. 21, 1947

2,429,400

UNITED STATES PATENT OFFICE 2,429,400

LATCH-TYPE THERMOSTATICALLY CONTROLLED REGULATOR

George W. Crise, Columbus, Ohio

Application January 19, 1944, Serial No. 518,858

3 Claims. (Cl. 74—2)

This invention relates to automatic control apparatus and, more specifically, to an improved thermostatic control mechanism for use in the automatic regulation of heating or air-conditioning systems, although in other of its adaptations, my improved control apparatus is applicable in the regulation or modification of the operation of humidity, pressure and light-responsive systems.

A general object of my invention is to provide a simple, efficient and inexpensive thermostatic control adapted for the regulation of valves, dampers or registers employed in heating and air-conditioning systems, and wherein the sensitive element of the control functions, without the use of electricity or other power medium, to effect the actuation of an associated latch mechanism, the latter having direct connection with the heating or air-conditioning regulating means to govern operating positions thereof.

Another object of the invention is to provide an automatic control for heating and air-conditioning systems in which the control functions mechanically to govern the operation of the associated latch mechanism and whereby, when the latch mechanism is released, the operation of the regulating devices of the associated heating and air-conditioning system is effected by the flow or draft of the heating or cooling fluids through such devices.

A further object of the invention is to provide a latch-type thermostat adapted to control intermittently the passage of a fluid through a confining structure and wherein power is obtained from the controlled flowing fluid for effecting the operation of the latch thermostat, thus enabling its sensitive element to operate normally in an unloaded condition, obtaining therefrom its highest degree of sensitivity and accuracy.

In its most useful application, my invention comprehends the individual control of registers employed in forced warm air heating and cooling systems and, also the control of water circulation in hot water heating and cooling systems.

For a further understanding of the invention, reference is to be had to the following description and the accompanying drawing, wherein:

Fig. 1 is a front elevational view of my improved thermostat control, illustrating the same when used in connection with the pivoted damper of a wall register;

Fig. 2 is a side elevation, partly in section, of the device shown in Figure 1;

Fig. 3 is a vertical sectional view disclosing my improved control when used in connection with a magnetic ball-type valve.

Referring more particularly to the drawing, the numeral 5 designates the base of my improved thermostatic control unit, said base being formed, in a preferred embodiment, so that it may be mounted flatly upon the room wall 6. The base carries a rotatable stud 7, with which is connected an upstanding indicator arm 8. The upper end of this arm terminates in a pointer lug 9, which is arranged so as to be movable over the arcuate and beveled upper surface 10 of the base 5, said upper surface having suitably applied thereto temperature-indicating numerals 11. Also, the upper end of the arm 8 terminates in an outwardly directed extension 12, which may be grasped by the fingers for the purpose of oscillating the indicator, and thereby control the operating positions of the stud 7. The stud is formed with a transverse slot in which is positioned and secured the inner end of a spirally coiled sensitive element, in this instance, a bimetallic thermostatic strip 13. This element is so formed that it unwinds in a counter-clockwise direction as the temperature ambient thereto increases and, conversely, the element winds in a clockwise direction as the temperatures about the same decrease.

The outer end of the element 13 coacts with a laterally and outwardly directed wing 14 formed on a latch member 15. This latch member is mounted for pivotal turning movement on a pin 16 projecting centrally from the base 5. At one side of the pin 16, the latch member 15 is formed with an opening 17 in which is disposed a stationary movement-limiting pin 18, the latter projecting from the base 5 to limit the extent of movement of the latch in response to the operating positions of the bimetallic element 13. The edge of the latch 15, opposite to the wing 14, is provided with an outwardly and laterally directed wing extension 19, which is adapted to be brought into and out of engagement with a laterally and outwardly directed lug 20 formed with a pivoted control lever 21. This lever is carried by a base mounted shaft 22 for oscillating movement, and the same is normally maintained in engagement with a base carried stop pin 23 by the action of a light coil spring 24. Consideration of this structure will disclose that when the temperature of the bimetallic element 13 is at or above a given normal, determined by the setting of the indicator arm 8, the fact that the element unwinds in a counter-clockwise direction as its temperature increases, causes the free end of said element to occupy an operating position or positions in which the wing extension 19 of the control lever 21 is engaged, preventing the latter from revolving about its pivotal axis 22. However, as the thermostatic element cools, the free end of said element oscillates the latch member about its pivotal mounting 16 in a direction in which the wing extension 19 thereof is removed from engagement with and spaced from the lug 20 of the control lever. This action, therefore, releases the control lever and allows the latter to oscillate against the resistance of its spring 24 under the influence of an extraneously applied force. Since the element 13 is not electrically heated, nor does it act as an electrical conductor, and operates freely in an unloaded manner in response to temperature variations, its highest sensitivity in accuracy of movement in response to temperature changes are obtainable.

The release of the control lever may be utilized in obtaining many different useful results. In Figs. 1 and 2 of the drawings, the structure is utilized in controlling the operation of the pivotally suspended damper 25 of a wall register 26, although it will be understood that this is but one of the many possible useful adaptations of my invention. In effecting such an operation, the pin or shaft 22, which carries the latch lever, extends through a metallic sleeve 27 carried by the base 5 and projecting horizontally through an opening formed in the mounting wall 6.

The rear end of the pin or shaft 22 carries a crank arm 28 and connected with a pin 29 formed on the outer end of the crank arm is a link 30. This link is connected with the upper end of a chain or other flexible cable 31, the lower portion of the chain passing around a guiding quadrant 32 formed with the damper 25 in concentric relation to its pivotal support 33 in the register 26, the extreme lower end of the chain or cable being secured, as by the use of a set screw 34, to the damper in offset relation with respect to its pivot 33. The register has connected therewith a standard air-conveying conduit 35 through which air, obtained from a forced air heating or cooling system, is advanced positively.

It will be evident that when the temperature surrounding the thermostat falls below a predetermined normal, the resultant release of the lever 21 will permit of the opening of the damper 25 in response to the force exerted on the rear surface thereof by the air being advanced through the conduit 35, thus permitting the heated or otherwise conditioned air to pass into the room through the outlet of the register. When the desired temperature within the room has been obtained, the thermostatic element unwinding in a counterclockwise direction, allows the latch 15 to drop into the path of the lug 20, particularly after the latch has returned to engagement with its stop pin 23 by the coil spring 24, and following discontinuance of forced air flow through the conduit 35. With the lever 21 so latched, the damper 25 is maintained against opening movement even though a positive pressure of air in the conduit 35 may be reestablished.

It will be noted that the latch member 15 may be formed from a light sheet metal stamping so that it is free to move in unison with the bimetallic element without imposing any sensible load or stress thereon. This elimination of load or friction enables the bimetallic element to respond sensitively to temperature variations.

In Fig. 3, my improved thermostatic control has been shown in conjunction with a regulating valve 40 used in heating or cooling medium. The valve 40, in a preferred embodiment, comprises a non-ferrous casing 41 having a fluid inlet 42 and outlet 43. The inlet terminates in a seat 44 which receives a magnetic valve ball 45, preferably of a high flux alloy, such as that known commercially as Alnico, a ferrous alloy containing aluminum, nickel and cobalt. Pivotally mounted as at 46 on the casing 41 is a U-shaped permanent magnet 47, the spaced side arms of which straddle the casing in registration with the ball 45, the outer web being connected as at 48 with the lower end of the chain or cable 31a.

The tapered seat 44 terminates at the upper end thereof in a cylindrical wall 49, which is slightly larger in diameter than the valve ball 45. When fluid pressure is applied to the under side of the ball valve, the same lifts from its seat to a limited extent, until the lifting action is arrested by the magnetic attraction of the magnet 47. The cylindrical walls 49 permit of such elevation of the valve ball but do not permit of any substantial flow of fluid heat-transfer medium through the valve casing.

The operation of the apparatus illustrated in Fig. 3 is as follows: When the circulation of water is started by the intermittent action of a circulator pump, not shown, of the associated heating or cooling system, it tends to cause the liquid heat transfer medium to flow through the valve 40 by lifting the ball 45 from its seat. However, the magnet 47 is in strong magnetic attracting relation with the ball and prevents the latter from rising far enough to give any substantial liquid flow through the valve unless the magnet 47 is allowed to swing in a counter-clockwise direction. Therefore, if the latch lever 21 of the associated thermostatic control is held against movement by the pivot stop device 15, the ball 45 will be held substantially on its seat by the action of the magnet. If, however, the lever 21 is released, the ball 45 will be permitted to move upwardly under the influence of fluid pressure in the inlet 42, swinging with it the magnet 47, and thereby providing for fluid passage through the valve.

Having thus described my invention, what I claim and desire to secure by Letters Patent of the United States is:

1. Thermostatic control apparatus comprising a base, a spirally coiled bimetallic element having an inner end supported in connection with said base and an outer end free to move back and forth in response to temperature variations, a latch member pivotally mounted on said base having engagement with the free outer end of said bimetallic element for limited floating movement in unison therewith as said element deforms in response to temperature variations, a control-operating lever pivotally mounted on said base and having a portion thereof disposed in the path of movement of said latch member when the latter occupies one of its operating positions and to clear said latch member when the latter occupies another of its operating positions in response to the action of said thermostatic element, a stop on said base, and spring means normally maintaining said lever in engagement with said stop.

2. Thermostatic control apparatus comprising a base, a spirally coiled bimetallic element having an inner end supported in connection with said base and an outer end free to move back and forth in response to temperature variations in the atmosphere ambient thereto, a latch member pivotally mounted on said base and having engagement with the free outer end of said bimetallic element for limited floating movement in unison therewith as said element contracts or expands in response to temperature variations, said latch member being formed with a laterally offset shoulder, a control-operating lever pivotally mounted on said base and having a portion thereof disposed in the path of movement of the shoulder of said latch member when the latter occupies one of its operating positions and to clear said shoulder when the latch member occupies another of its operating positions in responding to the action of said thermostatic element, a stop on said base, and spring means normally maintaining said lever in engagement with said stop.

3. Thermostatically actuated control apparatus comprising a base, an adjustable indicator pivotally mounted on said base, a spirally coiled bimetallic element having an inner end supported for movement in unison with said indicator and an outer end free for limited movement in response to adjacent temperature variations, a latch member pivotally mounted on said base having engagement with the free outer end of said bimetallic element for limited floating movement in unison therewith as said element deflects and responds to temperature variations, a control-operating lever pivotally mounted on said base and having a portion thereof disposed in the path of movement of said latch member when the latter occupies one of its operating positions and to clear said latch member when the latter occupies another of its operating positions in response to the deflection of said thermostatic element, a stop on said base, and spring means normally maintaining said lever in engagement with said stop.

GEORGE W. CRISE.

REFERENCES CITED

The following references are of record in the file of this patent:

UNITED STATES PATENTS

| Number | Name | Date |
| --- | --- | --- |
| 464,112 | Waldurf | Dec. 1, 1891 |
| 1,606,191 | Siebenmann | Nov. 9, 1926 |
| 1,648,662 | Shadrick | Nov. 8, 1927 |
| 1,756,660 | Perry | Apr. 29, 1930 |
| 1,850,646 | Ross-Walt | Mar. 22, 1932 |
| 1,897,600 | Bastian | Feb. 14, 1933 |
| 1,921,154 | Colman | Aug. 8, 1933 |
| 1,958,847 | Cunningham | May 15, 1934 |
| 2,240,763 | Dillman | May 6, 1941 |
| 2,385,536 | Pawelsky | Sept. 25, 1945 |

FOREIGN PATENTS

| Number | Country | Date |
| --- | --- | --- |
| 535,941 | Germany | Oct. 17, 1931 |